C. NAEGELEN.
PRESS HEAD.
APPLICATION FILED FEB. 25, 1911.
1,002,173.
Patented Aug. 29, 1911.
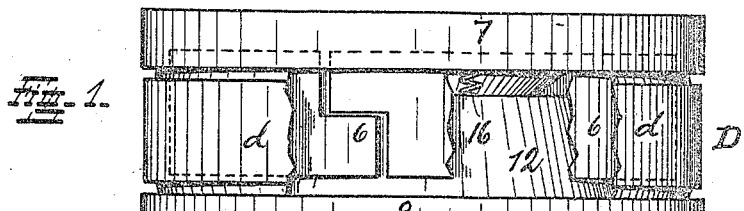
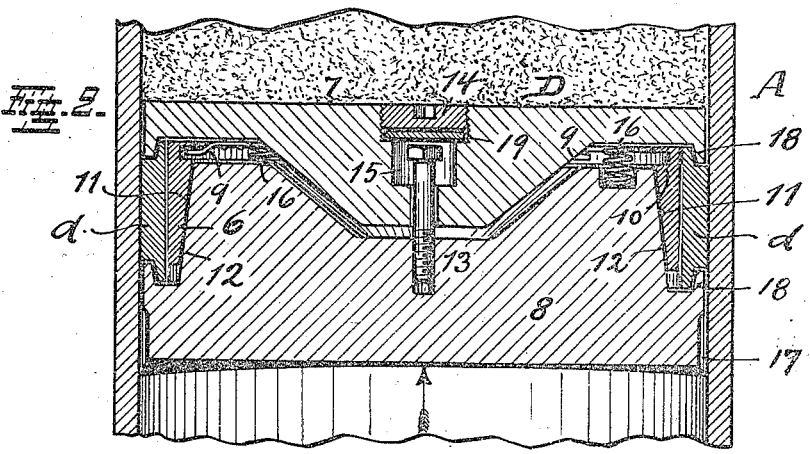
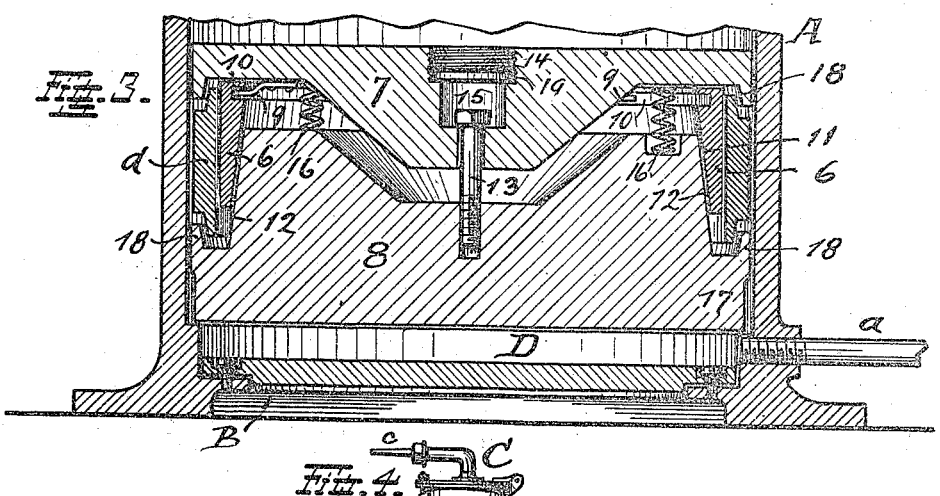
Witnesses.
Chas. G. Schmidt
T. LeBeau
Inventor:
Charles Naegelen
by C. Spengel atty.

UNITED STATES PATENT OFFICE.

CHARLES NAEGELEN, OF CINCINNATI, OHIO, ASSIGNOR TO THE CINCINNATI BUTCHERS' SUPPLY COMPANY, OF CINCINNATI, OHIO, A CORPORATION OF OHIO.

PRESS-HEAD.

1,002,173.     Specification of Letters Patent.     Patented Aug. 29, 1911.

Application filed February 25, 1911. Serial No. 610,791.

*To all whom it may concern:*

Be it known that I, CHARLES NAEGELEN, a citizen of the United States, and residing at Cincinnati, Hamilton county, State of Ohio, have invented certain new and useful Improvements in Press-Heads; and I do declare the following to be a clear, full, and exact description of the invention, attention being called to the drawing which accompanies this application and forms a part thereof.

This invention relates to improvements in the construction of press-heads, they being movable machine-elements actuated by fluid-pressure and used to compact plastic matter and to expel the same from an inclosure and through an outlet-orifice therein whereby it is forced to assume a certain shape.

The invention is described in connection with sausage-stuffers, being devices which consist of a cylindrical inclosure adapted to contain meat-dough and a press-head movably fitted into this cylinder and adapted, when moving toward one end of the same, to expel the meat dough, an outlet orifice being provided thereat through which the meat dough discharges in compacted consistency and proper shape suitable to be received by the sausage casings.

The press-head is moved by fluid-pressure which may be water or air, also steam if not otherwise objectionable, and which is admitted to act against one side of the press-head. This latter is single-acting, that is to say, it expels matter only while moving in one direction, after which, when the inclosure is empty, it returns to its initial position while a new charge is supplied.

It is essential that the press-head is tightly fitted into its inclosure to prevent any of the matter moved by it from remaining behind and also to prevent escape of the pressure-medium, which moves the head, past it and into the matter on the other side. It is also essential, after the press-head has emptied the inclosure and the impelling pressure is relieved, that it returns freely and quickly to its original position. Packing is provided which is adjusted automatically to these conditions and caused to be forced into close contact with the wall of the inclosure when the press-head moves under pressure while thereafter, when this pressure is relieved, this forced contact is caused to cease instantly, to permit the press-head to return freely to its normal position. The means whereby this adjustment of the packing is accomplished are found in the mechanical construction of the press-head and form the subject of this invention as hereafter described and claimed. The construction is also illustrated in the accompanying drawing, in which:—

Figures 1, 2 and 3, in sectional views of part of a stuffer-cylinder show the press-head in respectively high, intermediate and low positions. Fig. 4, shows at reduced scale the general appearance of such a stuffer.

The inclosure of the sausage-stuffer consists of the cylinder A, the permanently connected lower head B and the top C, which is in form of a removably connected lid which permits access for charging the cylinder. Locking means are provided to hold the same securely in position to complete the inclosure. This lid contains an outlet opening which is of a size and shape to suit the purpose, the same being the case with the discharge nozzle $c$ provided in connection with this opening.

D is the press-head fitted to the cylinder and adapted to move through the same from an initial position in its lower part toward the top thereof whereby the contents of the cylinder above the press-head are compacted and expelled through nozzle $c$. Air or water under pressure are preferable mediums to move the press-head, being admitted through a pipe $a$. A tight fit of the press-head against the inside of the cylinder-wall is essential to prevent any of the matter to be left behind and also to prevent the pressure medium from leaking past the head where it would mingle with the matter in the cylinder. Annular packing $d$ is provided around the press-head for this purpose. It is also desirable that the head returns freely to its normal position when the pressure back of the same is relieved after it has done its work and arrived in its high position.

Since packing fitted as tight against the cylinder-wall as required for the purpose, to be pressure-proof and to prevent leakage, would obviously interfere with a prompt return of the head to its low position, provision is made whereby the degree of contact of the packing with the cylinder-wall is rendered variable, the operation of the means used for this purpose being so that when the head moves under pressure, said packing $d$ is forced in hard contact with the cylinder-wall, whereas thereafter, as soon as the pressure is taken off, the intensity of this contact is abruptly reduced, thereby permitting the head to drop instantly to its low position. For such purpose the packing is backed by a wedge-ring 6 provided behind it, said ring being split to permit it to expand and to contract. The arrangement is so that when pressure is applied against the head, said ring is caused to expand, thereby forcing the packing hard against the cylinder-wall. Return of the ring to normal condition, after the pressure against the head is relieved, produces the opposite effect with respect to the packing. In order to obtain this action of the wedge-ring, the head is made of two parts or sections of which one is in the nature of a follower with respect to the other one and held to it by a connection which permits these sections to move apart to a certain limited extent. The wedge-ring is held to one of these sections and adapted to co-act with the other one in a manner that when the sections approach each other, the ring is caused to expand, whereas when the sections move apart, the ring is permitted to contract. These sections are indicated in the drawing by numerals 7 and 8 and as shown the wedge-ring is connected to the upper one of these sections. This connection of the ring is of a character which does not interfere with its expanding and contracting movement. Suitable means are provided for the purpose in the form of clips 9 on the underside of section 7 which extend into a groove 10 on the inside of the wedge-ring. The innerside of the wedge-ring is flaring as shown at 11. The upper portion of section 8 is reduced in diameter and occupies the interior of the ring, its outside being tapered as shown at 12 and complementary to the flaring inner side of the ring. A bolt 13 is used to hold the sections to each other, it being rigidly seated in one section and in loose engagement with the other one as best shown in the drawing. The position of the head of the bolt limits the distance which the sections may move apart which movement need not be very extensive and should not be more than necessary for the purpose that is merely sufficient to break the contact between the opposite surfaces 11 and 12. The bolt may also be used to adjust the proper extent of this movement, access to its head for such purpose being made possible by removing a screw-plug 14 which closes a pocket 15 occupied by said head.

Fig. 2, shows the head in an intermediate position and its parts as they appear when it moves under pressure from one end of the cylinder to the other. The conical part of the lower section is pushed into the wedge-ring and by expanding the same forces the packing tightly against the cylinder-wall. When the pressure is taken off at the end of the movement, the two sections of the head are free to separate, thereby breaking the contact between the lower section and the wedge-ring which immediately shrinks to its normal size. This causes the packing to loose pressure-contact with the cylinder-wall and permits the head to drop freely back to its initial position as shown in Fig. 3.

Prompt separation of the sections may be favored by making the lower one quite bulky and heavy as shown in the drawing. This does not necessarily insure positive or quick action however and therefore I use spring-pressure to bring about a prompt break of contact between surfaces 11 and 12. One spring in the center, or a number of them arranged as shown at 16 may be used. These springs continue also to hold the sections apart after the head has arrived in its low position as shown in Fig. 3. An advantage of this condition is that the packing commences to set against the cylinder-wall as soon as the weight of the charge depresses the upper section and before the pressure-medium is admitted against the underside of the head. When finally this admission takes place, a tight-set packing precludes possibility of leakage.

Removal of the head from the cylinder may become necessary for any purpose, cleaning of the cylinder, repairs, etc. The pressure-medium is used to lift it to a position shown in Fig. 1, where it may be conveniently reached and further handled. To guard against accidents during this manipulation, as for instance by a possible blow-out of the head, ports 17 are provided in form of a number of grooves which open the cylinder to the outside before the head is out of the same, the reduced pressure preventing further movement of the head.

To hold the packing to the head, particularly when the latter is out of the cylinder as shown in Fig. 1, I provide flanges 18 on the opposite inner edges of the sections which are adapted to engage the packing at its edges and retain the same in position.

19 is a washer to prevent leakage through the upper section of the head of any matter which might possibly escape into the head at the edges of the packing.

Having described my invention, I claim as new:

1. In a press-head, the combination of annular packing, a split wedge-ring back of the same, a press-head-section to which this wedge-ring is connected, another press-head-section fitted into this ring and adapted to spread it to force the packing outwardly and means which under normal conditions prevent this press-head-section and this wedge-ring from moving with respect to each other.

2. In a press-head, the combination of two yieldingly spaced sections, means whereby they are positively prevented from moving apart beyond a fixed distance a split wedge-ring connected so as to move with one section and fitted around the other section and packing provided around the wedge-ring and adapted to be forced outwardly when the two sections approach each other.

3. In a press-head, the combination of an upper and of a lower section having marginal flanges extending toward each other, means whereby they are movably held to each other with a space between them, a packing-ring between these sections and engaged at its edges by the flanges on these sections, a split wedge-ring carried by one of the sections and back of this packing and adapted to co-act with the other section for the purpose of expanding the packing and means which prevent this action under normal conditions.

4. A press-head provided on its underside with a split wedge-ring, packing fitted around this ring, a follower held to this press-head with a space between the two, springs between the two which hold them apart under normal conditions but permit the follower and the split ring to co-act when under pressure for the purpose of expanding the packing.

5. A press-head consisting of two sections yieldingly connected to each other with a space between them, expansible packing provided between these sections and ports provided on the outside of the lower section for the purpose described.

6. A cylindrical press-head provided on its annular side with ports which extend inwardly from one of the edges of said side and terminate between the edges thereof.

In testimony whereof, I hereunto affix my signature in the presence of two witnesses.

CHARLES NAEGELEN.

Witnesses:
C. SPENGEL,
T. LE BEAU.